(12) United States Patent
Jiang et al.

(10) Patent No.: US 8,933,953 B2
(45) Date of Patent: Jan. 13, 2015

(54) MANAGING ACTIVE THREAD DEPENDENCIES IN GRAPHICS PROCESSING

(75) Inventors: Hong Jiang, El Dorado Hills, CA (US); James M. Holland, Folsom, CA (US); Prasoonkumar Surti, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1058 days.

(21) Appl. No.: 12/215,850

(22) Filed: Jun. 30, 2008

(65) Prior Publication Data
US 2009/0327662 A1  Dec. 31, 2009

(51) Int. Cl.
| | |
|---|---|
| *G06T 1/00* | (2006.01) |
| *G09G 5/36* | (2006.01) |
| *G09G 5/37* | (2006.01) |
| *G06F 9/30* | (2006.01) |
| *H04N 7/12* | (2006.01) |
| *G06F 9/38* | (2006.01) |
| *G06F 9/48* | (2006.01) |

(52) U.S. Cl.
CPC ............ *G06F 9/3851* (2013.01); *G06F 9/3838* (2013.01); *G06F 9/4881* (2013.01)
USPC ........... 345/556; 345/522; 345/547; 345/562; 712/216; 712/217; 348/384.1; 348/420.1; 375/240.24; 375/240.25

(58) Field of Classification Search
USPC ......... 345/501, 522, 547, 555, 559, 562, 556; 712/216, 217; 348/384.1, 420.1, 421.1; 375/240, 240.01, 240.24, 240.25
See application file for complete search history.

(56) References Cited

U.S. PATENT DOCUMENTS

| | | | |
|---|---|---|---|
| 7,434,032 B1 * | 10/2008 | Coon et al. .................... 712/217 |
| 2007/0030280 A1 * | 2/2007 | Paltashev et al. ............. 345/506 |
| 2010/0122044 A1 * | 5/2010 | Ford et al. ..................... 711/154 |

FOREIGN PATENT DOCUMENTS

WO   WO2008/007038   1/2008

OTHER PUBLICATIONS

European Patent Office, Office Action issued in European Application No. 09251675.6, 5 pages, Sep. 28, 2009.
Krishnan V., Torrellas J., A Chip-Multiprocessor Architecture With Speculative Multithreading, IEEE Transactions on Computers, IEEE Service Center, Los Alamitos, CA, US, vol. 48, No. 9, Sep. 1, 1999, pp. 866-880.

* cited by examiner

*Primary Examiner* — Wesner Sajous
*Assistant Examiner* — Andrew Shin
(74) *Attorney, Agent, or Firm* — Trop, Pruner & Hu, P.C.

(57) ABSTRACT

A scoreboard for a video processor may keep track of only dispatched threads which have not yet completed execution. A first thread may itself snoop for execution of a second thread that must be executed before the first thread's execution. Thread execution may be freely reordered, subject only to the rule that a second thread, whose execution is dependent on execution of a first thread, can only be executed after the first thread.

18 Claims, 3 Drawing Sheets

MANAGING ACTIVE THREAD DEPENDENCIES IN GRAPHICS PROCESSING

BACKGROUND

This relates generally to graphics processing and specifically to the decoding of information in the course of graphics processing.

In order to reduce the bandwidth of data transmitted to and from processor-based systems, the information may be encoded in a way which compresses the information. When that information arrives at a receiving processor-based system, it must be decoded or decompressed.

Typically, in systems with many execution units, software may be utilized to keep track of thread dependencies—where execution of one thread is dependent on execution of another thread. Thread dependencies are important because, when there are a large number of threads, and some threads must be executed before others, these dependencies must be accounted for. However, when the number of threads is large, and the number of dependencies is large, maintaining the status of all the threads and all the dependencies tends to be cumbersome.

DETAILED DESCRIPTION

Figure 1:
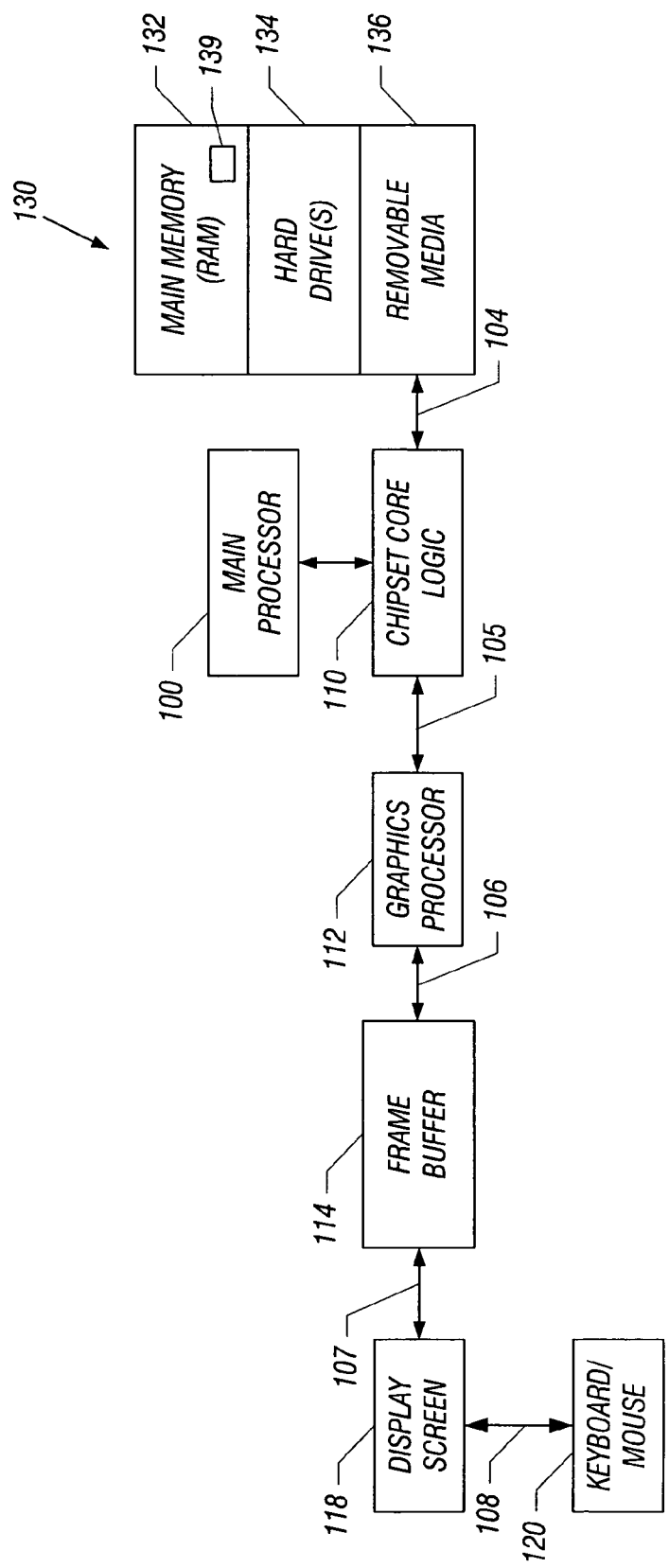
FIG. 1 is a system depiction in accordance with one embodiment of the present invention.

A computer system 130, shown in FIG. 1, may include a hard drive 134 and a removable medium 136, coupled by a bus 104 to a chipset core logic 110. The core logic may couple to the graphics processor 112 (via bus 105) and the main or host processor 100 in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

In the case of a software implementation, the pertinent code may be stored in any suitable semiconductor, magnetic or optical memory, including the main memory 132. Thus, in one embodiment, code 139 may be stored in a machine readable medium, such as main memory 132, for execution by a processor, such as the processor 100 or the graphics processor 112.

Figure 2:
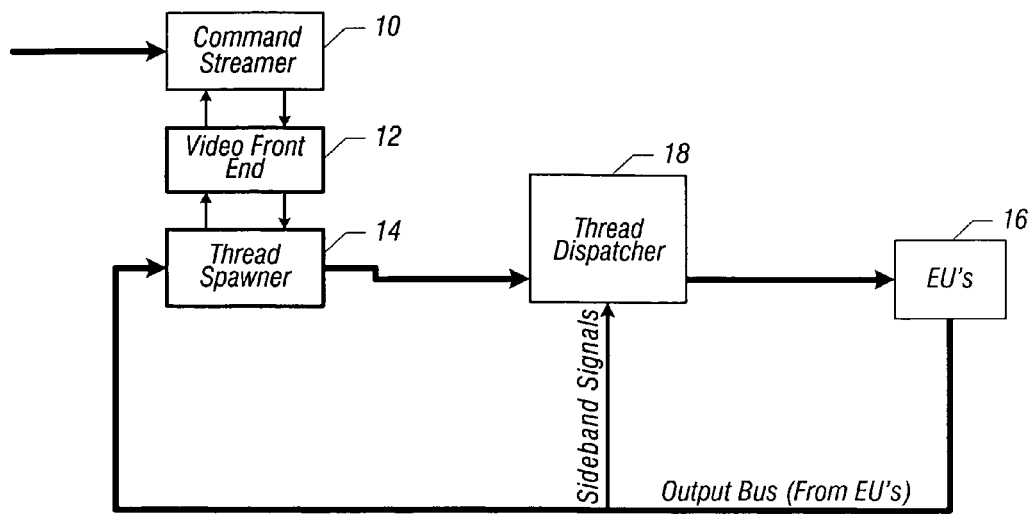
FIG. 2 is a schematic depiction of one embodiment of the present invention.

Referring to FIG. 2, the graphics core logic 110 may include a graphics pipeline. The graphics pipeline may include a command streamer 10, a video front end 12, and a thread spawner 14 coupled to a thread dispatcher 18, in addition to other components.

The graphics core logic 110 may receive inputs through the command streamer 10 from a driver or other software executed by the graphics processor 112 or main processor 100. Typically, the driver provides the work which must be executed by a number of execution units 16 of the graphics processor 112. The jobs that must be executed are dispatched by the thread dispatcher 18. The thread spawner 14 creates the jobs and then threads are executed by the execution units 16.

In one embodiment, the command streamer 10 may be a direct memory access engine for fetching commands that control the generation of threads originated from the host or main processor 100. The video front end 12 contains video processing functions. The thread spawner 14 is responsible for generating and arbitrating threads that originate from the host and the graphics processor 112 that may include the execution unit 16. The thread dispatcher 16 arbitrates the thread generation request.

Figure 3:
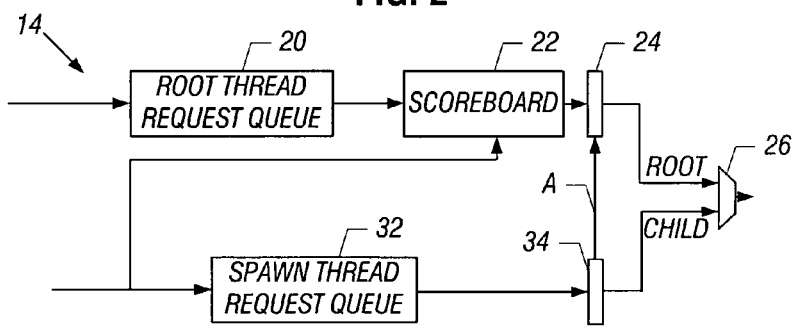
FIG. 3 is a block diagram showing the thread spawner of FIG. 1 in accordance with one embodiment.

Referring to FIG. 3, the thread spawner 14 includes a root thread request queue 20 that receives the root thread requests from the video front end 12. The root threads are threads that may create subsequent child threads. The thread requests are stored in the root thread request queue 20. Any thread created by another thread running in an execution unit 16 is called a child thread. Child threads can create additional threads, all under the tree of a root that was requested via a video front end 12 path.

The thread spawner 14 stores information needed to get the root threads ready for dispatch and then tracks dispatched threads until their retirement. The thread spawner 14 also arbitrates between root and child threads. The thread request queue 20 feeds the scoreboard 22 that manages the inter-thread dependencies and the dispatch of root threads. A spawn thread request queue 32 is responsible for requesting threads that are spawned from root threads.

The output from the scoreboard 22 goes to a buffer 24 and the output from the spawn thread request queue 32 goes to a buffer 34. The two buffers 24 and 34 are synchronized as indicated by the arrow A between the buffers 24 and 34. The output of the buffer 24 is the root threads and the output of the buffer 34 is the child threads. These threads are synchronized by a synchronization multiplexer 26 for transmission to the thread dispatcher 18.

Figure 4:
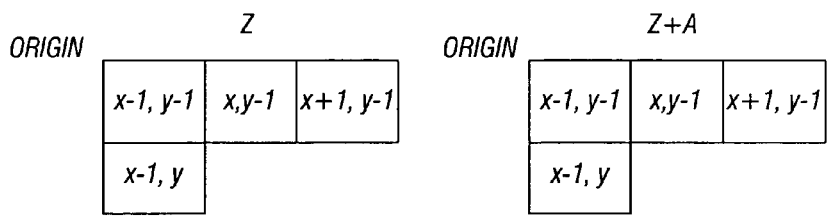
FIG. 4 is a depiction of macroblocks in two different frames.

The scoreboard 22 accounts for spatial dependencies between threads. FIG. 4 can be used to illustrate examples of spatial dependencies within and between two different frames Z and Z+A. In the frame Z, a macroblock of interest may have coordinates (X, Y) relative to all the other macroblocks within the frame where X and Y give row and column coordinates. Assuming the origin of the images (0, 0) is in the upper left corner, the macroblock directly above the macroblock (X, Y) is (X, Y−1), and the macroblock immediately to the left of the macroblock (X, Y) is (X−1, Y) and so on. In order to decode a given macroblock, it may be necessary to decode information from its neighbors, such as the neighbors (X−1, Y), (X−1, y−1), (X, Y−1), and (X+1, Y−1).

These dependencies may be kept track of by the scoreboard 22. The scoreboard 22 basically accounts for these dependencies relative to macroblocks of interest, in this case macroblock (X, Y), in the process of being dispatched by the thread spawner to an execution unit. Thus, if macroblock (X, Y) is dependent on the macroblock (X, Y+1), there is a delta between the macroblock (X, Y) and the macroblock dependency of +1 in the Y direction. This may be specified by a three-coordinate system where X is the first coordinate, Y is the second coordinate, and Z is the third coordinate. Thus, such a dependency would be specified for the macroblock (X, Y) by a delta of (0, 1, 0). There may be many dependencies for any macroblock and, hence, many deltas are checked.

The Z direction accommodates dependencies between two different frames. For example, if the macroblock (X, Y) in frame Z is dependent on the macroblock (X, Y) in the frame Z+A, there would be a dependency in the Z direction. This dependency can be also specified as a delta of (0, 0, A).

Z can also be used to denote different logical processes on the same frame that are not dependent on each other. If those processes are A and B, Z may be set equal to zero for all A operations and Z may be set equal to one for all B operations. This allows one physical scoreboard to manage many logical scoreboards by keeping all Z delta values at zero. Thus, Z can be used to manage macroblocks (1) with dependencies, (2) without dependencies, (3) across different frames, or (4) on different operations with the same frame.

Figure 5:
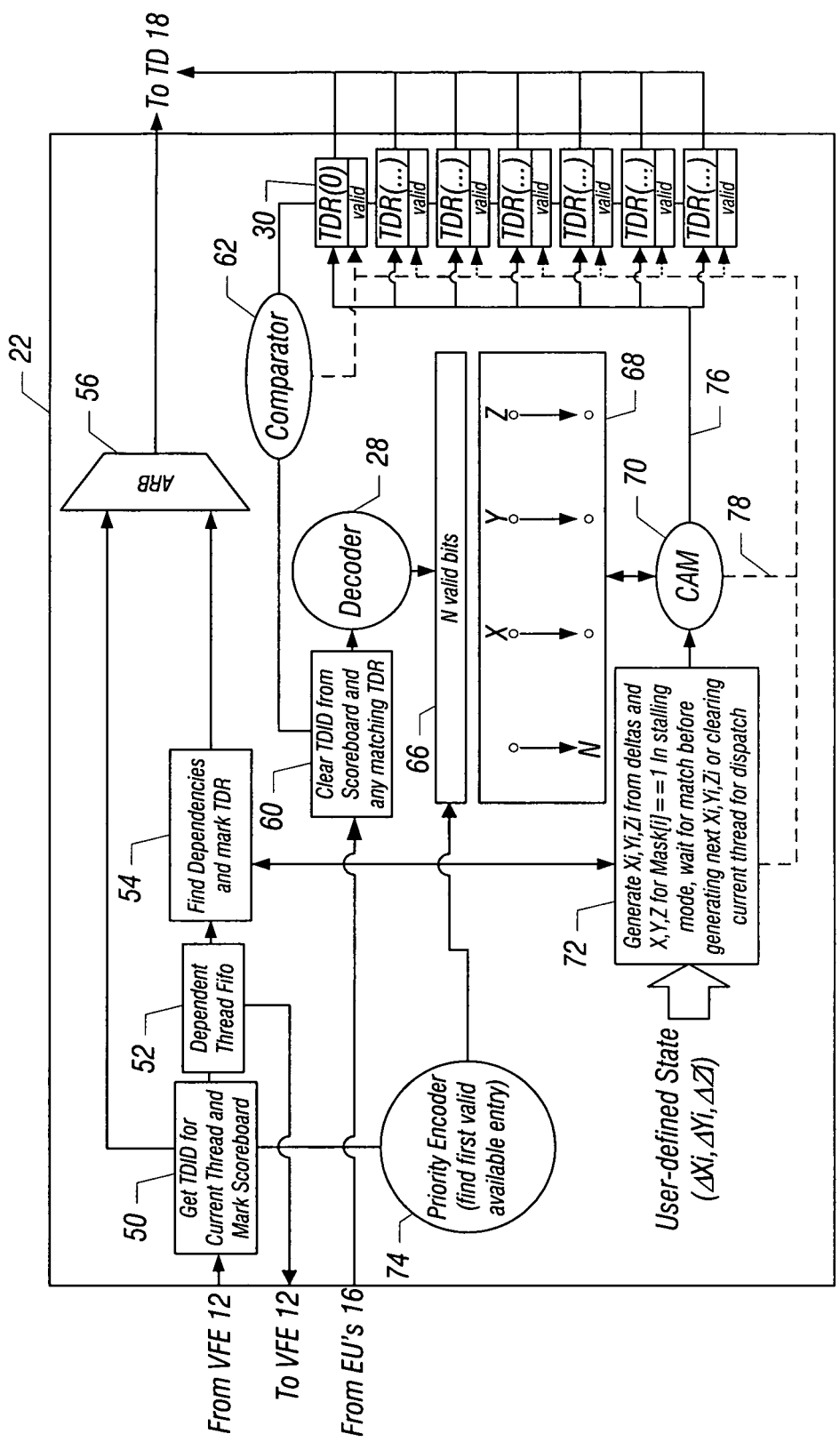
FIG. 5 is a depiction of the scoreboard register 22 of FIG. 2 in accordance with one embodiment of the present invention.

Thus, referring to FIG. 5, which shows more detailed operation of the scoreboard 22, the thread requests from the video front end 12 are handled by a block 50 which gets a unique thread identifier (TDID) for the current thread and marks the scoreboard register 68. The scoreboard register 68 includes columns for each of the coordinates X, Y, and Z and rows for each numbered thread or for each thread identifier. Each active thread receives a thread identifier (having identifiers 1 to N) to make up the rows of the scoreboard register 68.

Marking the scoreboard simply means that whenever a thread is dispatched, the scoreboard register 68 must be advised that a thread is in flight. The priority encoder 74 determines what the next available thread identifier is by looking at the valid bits in the register 66. The register 66 in effect tells what bits are valid in the scoreboard register 68. Thus, the next valid bit is assigned to the next thread and that thread is then considered "marked" at the block 50. As a result of being marked, an entry is set up in the scoreboard register 68 corresponding to the thread identifier, placing the entry in the appropriate row where the rows are numbered from 1 to N. The marked thread provides its X, Y, and Z coordinates, and in return the thread is provided with the thread identifier which could also be considered a row number. The thread surrenders its thread identifier when it is retired via completion of execution, in an execution unit 16.

Generally, while all threads are provided thread identifiers, less processing in the scoreboard is needed for independent threads which have no dependencies. Those threads can pass upwardly from block 50 and over to the upper port of the arbitrator 56.

Dependent threads are collected in a first in, first out (FIFO) buffer 52. The execution of a dependent thread depends on the execution of another potentially active (potentially unexecuted) thread. This allows a number of dependent threads to be moved through the block 50 to get them out of the way so that ensuing independent threads may be quickly processed and passed around to the arbiter 56 when unresolved dependencies stall the dependent thread FIFO buffer 52. The arbiter 56 looks at independent threads when the dependent threads are stalled.

Then the dependent threads are processed sequentially from the first in, first out buffer 52. Their dependencies are identified in block 72 and the thread dependency registers 30 can be marked with those dependencies in some cases. Block 54 provides the dependencies and the X, Y, and Z coordinates of those dependencies to a block 72. If both types of threads are ready for dispatch, the dependent threads may be given a higher priority in one embodiment. The block 72 develops the deltas, as described above, from the coordinates of the thread and the relative coordinates to the macroblocks or frames where dependencies reside.

In one mode of operation of the scoreboard 22, called the "stalling mode", the scoreboard 22 waits for a match before generating the next X, Y, and Z coordinates or deltas, or clearing the current thread for dispatch. Thus, in the stalling mode, a thread is not launched until all threads it is dependent on are retired (i.e. executed and no longer active i.e. retired). Thus, the thread FIFO buffer 52 also advises the video front end 12, as indicated by the arrow below the block 52, when the stalling mode is encountered and the buffer 52 becomes full.

The arbitrator 56 selects either an independent or a dependent thread to be executed by the execution units 16, passing it through a thread payload 58. Threads that have been executed by execution units 16 come back into a block 60 that clears the thread identifier from the scoreboard register 68 and any matching thread registers 30. The comparator 62 helps to find the matching thread registers 30.

Thus, once a thread is executed, any thread whose execution was dependent on the execution of that thread needs to be notified. Particularly in the stalling mode, a thread cannot be dispatched until any threads that it is dependent on have been executed. The comparator 62 may be used to reset the thread dependency registers 30 to remove the dependencies for any threads retired during the checking of thread dependencies.

Then the content addressable memory or CAM 70 determines whether there is any thread in the registers 68 upon which a thread, that wants to be dispatched, is dependent. If there is no entry in any row of the scoreboard register 68, then it can be deduced that there is no such dependent thread currently in execution, and the thread can be released as ready to be dispatched, and may be passed into the arbitrator 56 from the block 54. If there are dependencies in the stalling mode, the thread may be forced to wait for those dependencies to clear.

In accordance with another mode of operation of the scoreboard 22, called the broadcasting mode, which is more robust than the stalling mode, the dependencies of a given thread that is to be dispatched are determined, the thread identifiers of those dependencies are obtained and put into a thread dependency register 30, and then the thread is dispatched, even though those dependencies are still existent or outstanding.

In effect, the thread is dispatched to an execution unit 16 and called upon to manage its own dependencies. The thread does this by snooping retiring thread TDIDs that are broadcast to each execution unit 16 and the scoreboard block 60. Once the thread determines that all threads upon which it is dependent has been cleared, then the thread, sitting idle in an execution unit 16, can proceed to execute in that execution unit 16.

Each thread uses eight bits, in one embodiment, to indicate which of up to eight dependencies, each indicated by a delta, are significant. The eight deltas are loaded in a predefined order into successive thread dependency registers 30. The thread then knows, based on its eight bits, which dependency registers it must check to determine if the dependencies that matter have been retired.

The difference over the stalling mode is that, in the broadcasting mode, the thread is basically launched by the scoreboard and then the thread in effect controls when it begins execution, on its own, by watching for retiring thread information. In the broadcasting mode, the current thread is dispatched from the arbiter 56 with outstanding dependencies and the additional payload of thread dependency registers 30 containing the thread identifiers of all the outstanding dependent threads.

When a given thread retires via execution by an execution unit 16, in addition to informing the scoreboard 22, it broadcasts its thread identifier to all execution units 16. A dispatched thread then begins execution once it receives a thread identifier for all the thread dependency registers dispatched with it.

In still another mode of operation, called the in-order mode, the scoreboard 22 marks each thread dependent on a thread identifier of the thread that was dispatched immediately preceding the current thread.

In accordance with some embodiments of the present invention, the scoreboard 22 may be implemented in hardware, which may improve performance and speed. A hardware scoreboard 22 can more efficiently dispatch threads out of order, allowing reordering of workloads for performance improvement, in some embodiments. The only rule that the scoreboard 22 enforces, in some embodiments, is that a thread A whose execution is dependent on execution of a thread B has to arrive at scoreboard 22 after thread B arrives at scoreboard 22. If thread A arrived before thread B, the scoreboard would not observe thread B and would assume thread B has retired, hence, incorrectly clearing thread A. However, any other reordering may be done, for example, to improve performance. Generally, the driver makes sure that the rule is always followed, in some embodiments.

In some embodiments, the number of threads that must be executed far exceed the number of active threads in the scoreboard 22. By enabling the scoreboard 22 to only keep track of active threads (i.e. threads not yet retired), the size and efficiency of the scoreboard may be dramatically improved in some embodiments.

The blocks indicated in FIGS. 1, 2, 3, and 5 may constitute hardware or software components. In the case of software components, the figures may indicate a sequence of instructions that may be stored in a computer readable medium such as a semiconductor integrated circuit memory, an optical storage device, or a magnetic storage device. In such case, the instructions are executable by a computer or processor-based system that retrieves the instructions from the storage and executes them. In some cases, the instructions may be firmware, which may be stored in an appropriate storage medium.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

While the present invention has been described with respect to a limited number of embodiments, those skilled in the art will appreciate numerous modifications and variations. It is intended that the appended claims cover all such modifications and variations as fall within the true spirit and scope of this present invention.

What is claimed is:

1. A method comprising:
   managing, in the scoreboard, threads for execution of threads by a plurality of execution units;
   keeping track of threads received by the scoreboard that have not yet finished executing;
   clearing threads that have been executed by the execution units from the scoreboard;
   enabling the order of thread execution to be changed to any order so long as each thread that depends on completion of other threads arrives at a scoreboard after the other threads;
   receiving thread identifiers for executed threads, retiring the thread identifiers of executed threads and enabling threads awaiting execution of a dependency to snoop thread identifiers of executed threads; and
   enabling each of said threads to manage its own dependencies.

2. The method of claim 1 including enabling reordering of thread execution.

3. The method of claim 1 including broadcasting the completion of execution of a thread in one execution unit to other execution units.

4. The method of claim 1 including determining spatial dependencies.

5. The method of claim 4 including determining the dependency of a thread for one macroblock on execution of thread for a neighbor macroblock.

6. The method of claim 5 including determining a dependency of one thread on a thread in a different frame.

7. The method of claim 4 including using a coordinate to indicate spatial dependencies and different logical processes on the same frame.

8. The method of claim 1 including indicating a dependency between two threads by indicating a delta between coordinates of macroblocks within the same frame and macroblocks in different frames.

9. An apparatus comprising:
   a video front end; and
   a scoreboard coupled to said video front end, said scoreboard being configured to manage threads for execution, to keep track of threads received by said scoreboard that have not yet finished executing, and to clear from the scoreboard threads that have been executed, said scoreboard to allow the order of thread execution to be changed to any order so long as each thread that depends on completion of other threads arrives at a scoreboard after the other threads, said scoreboard to receive thread identifiers for executed threads, retire the thread identifiers of executed threads and enable threads awaiting execution of a dependency to snoop thread identifiers of executed threads, said scoreboard to enable each of said threads to manage its own dependencies.

10. The apparatus of claim 9 including an execution unit coupled to said scoreboard.

11. The apparatus of claim 9 wherein said scoreboard includes a scoreboard register to list threads by thread identifiers and, for each thread, to provide the coordinates of an associated macroblock.

12. The apparatus of claim 11, said scoreboard including registers to store outstanding thread dependencies.

13. The apparatus of claim 12, said scoreboard to enable a thread to launch before a dependency has cleared.

14. The apparatus of claim 9 wherein said apparatus to enable thread execution to be reordered.

15. The apparatus of claim 9, said scoreboard to process threads that are not dependent on other threads ahead of threads that are dependent on other threads.

16. The apparatus of claim 15, said scoreboard including a thread dependency register to indicate the dependency of a thread by storing the dependency.

17. The apparatus of claim 9, said scoreboard to manage a plurality of logical scoreboards.

18. The apparatus of claim 9, said scoreboard to enable a thread to manage its own dependencies.

* * * * *